Jan. 3, 1961    C. W. WOOD ET AL    2,967,022
VALVE MECHANISM
Filed April 20, 1956    2 Sheets-Sheet 1
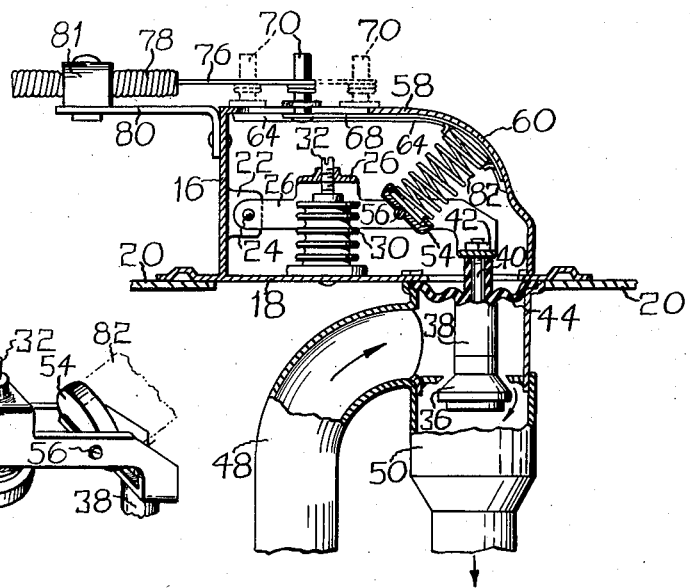
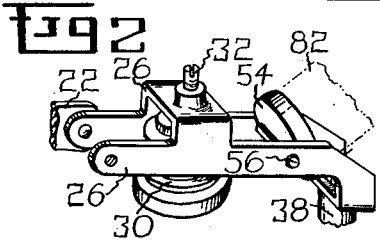
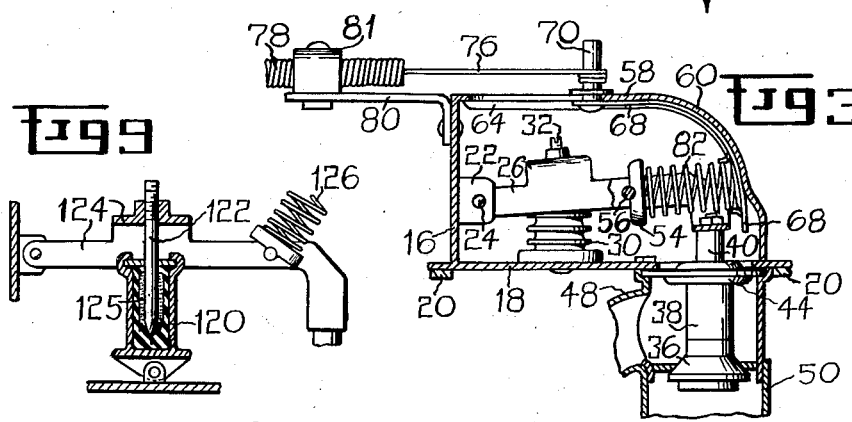
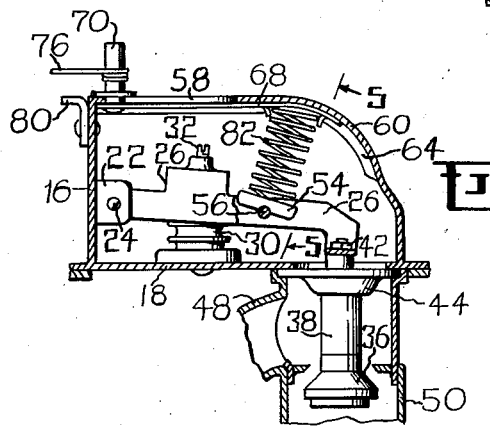
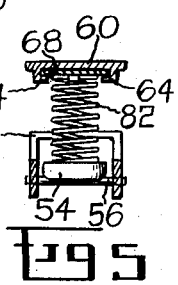
INVENTORS
CHARLES W. WOOD
CARLTON W. BONDURANT
BY
Dybvig and Jacox
THEIR ATTORNEYS

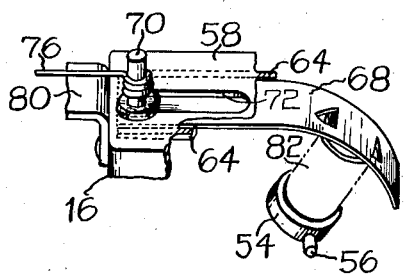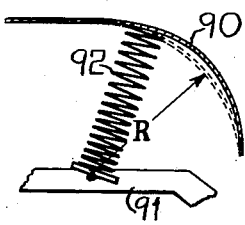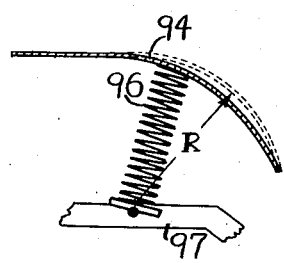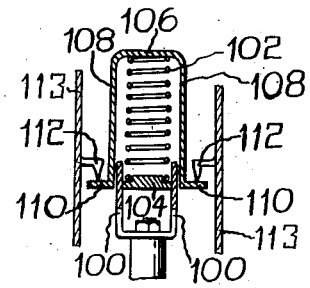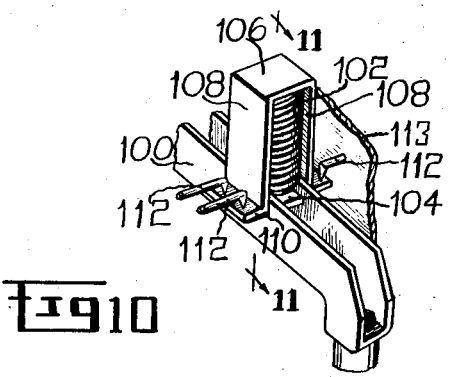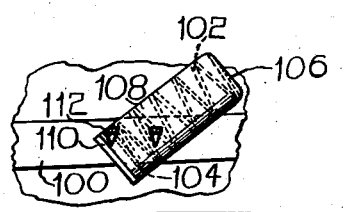

United States Patent Office 2,967,022
Patented Jan. 3, 1961

2,967,022

VALVE MECHANISM

Charles W. Wood, Lebanon, and Carlton W. Bondurant, Dayton, Ohio, assignors to Standard-Thomson Corporation, Vandalia, Ohio, a corporation of Delaware Filed Apr. 20, 1956, Ser. No. 579,651

2 Claims. (Cl. 236—99)

This invention relates to a valve mechanism. This invention relates more particularly to a space heater valve mechanism. This invention relates still more particularly to a heater valve mechanism for use in a heating system for automobiles and the like. However, the invention is not so limited in that the invention may be applied to numerous types of heating or cooling equipments. The invention may also be applied to numerous types of actuator mechanisms.

This application relates to co-pending application Serial No. 185,486, filed October 18, 1950, now Patent No. 2,743,872, in which Charles W. Wood is a co-inventor and is also a co-inventor herein.

An object of this invention is to provide a valve mechanism for use in control of liquid flow in a space heating system.

Another object of this invention is to provide a valve mechanism in which the forces applied to the operation of a valve member may be easily and readily adjusted.

Another object of this invention is to provide a lever type actuator device in which resilient forces applied to the mechanism may be easily and readily adjusted.

Another object of this invention is to provide a valve mechanism for a heating system, which valve mechanism occupies a minimum amount of space.

Other objects and advantages reside in the construction of parts, the combination thereof and the mode of operation, as will become more apparent from the following description.

In the drawings,

Figure 1 is a side sectional view with parts broken away of a valve mechanism of this invention.

Figure 2 is a fragmentary perspective view of elements of a valve mechanism of this invention.

Figure 3 is a side sectional view, similar to Figure 1, but showing the elements of the valve mechanism in different operating positions.

Figure 4 is a side sectional view similar to Figures 1 and 3. Figure 4 shows elements of the valve mechanism in operating positions other than those positions shown in Figures 1 and 3.

Figure 5 is a sectional view taken substantially on line 5—5 of Figure 4.

Figure 6 is a fragmentary perspective view showing a portion of the elements of the valve mechanism of the invention.

Figure 7 is a schematic diagram showing a modification of a valve mechanism of this invention.

Figure 8 is a schematic diagram showing another modification of a valve mechanism of this invention.

Figure 9 is a side elevational view with parts shown in section of another modification of a valve mechanism of this invention.

Figure 10 is a fragmentary perspective view of still another modification of this invention.

Figure 11 is a section view taken substantially on line 11—11 of Figure 10.

Figure 12 is a fragmentary side elevational view of the modification of this invention shown in Figures 10 and 11.

Referring to the drawings in detail, the valve mechanism of this invention comprises a vertical support member 16 and a horizontal support member 18 as shown in Figures 1, 3, and 4. The support members 16 and 18 are attached one to the other and may be secured in any suitable manner to mounting plates 20.

A bracket 22 is shown attached to the vertical support member 16. Pivotally attached to the bracket 22 by means of a pin 24 is a lever 26. A thermal responsive actuator 30 is supported by the horizontal support member 18 and is attached to the lever 26 by means of a threaded pin 32. The thermal responsive actuator 30 is adapted to pivotally move the lever 26 in response to changes in temperature.

Also attached to the lever 26 and in spaced relation from the thermal responsive actuator 30 and the pivot pin 24 is a valve member 36 having a stem 38. A connector bolt 40, extending through the stem 38 and provided with a nut 42, secures the stem 38 to the lever 26. The stem member 38 extends through an opening in the horizontal support member 18. A diaphragm 44 is attached to the stem 38 and is also attached to the horizontal support member 18 for sealing the opening in the horizontal support member 18. The valve member 36 is adapted to control flow of fluid from an inlet conduit 48 to an outlet conduit 50, the conduits 48 and 50 being attached to the horizontal support member 18.

The conduit 48 is adapted to be connected to a source of fluid. The conduit 50 is adapted to be connected to a heat exchange unit from which air, the temperature of which is affected by fluid flowing in conduit 50, reaches the thermal responsive actuator 30 so that the lever 26 is moved in response to changes in temperature of such air.

It is also to be understood that within the purview of this invention, the conduit 50 may be connected to a heat exchange unit from which a liquid or other fluid reaches the thermal responsive actuator 30 for automatic control of the valve 36.

A spring seat 54 is pivotally attached to the lever 26 by means of a pin 56. A cover member 58 is attached to the support members 16 and 18 in spaced relation from the lever 26. A portion of the cover member 58 is in the form of an arcuate cam member 60. The cover member 58 is provided with a pair of longitudinally extending spaced apart guide flanges 64, as shown in Figures 5 and 6, forming a slide groove therebetween. Slidably retained between the guide flanges 64 is an elongate flexible slide arm 68. A pin member 70, normal to the arm 68, slidably extends through a slot 72 in the cover member 58 and is attached to the slide arm 68. A suitable semi-rigid operator cable 76 is attached to the pin member 70 for movement thereof, providing means for remote control of the slide arm 68. The cable 76 is disposed within a conduit 78 which is attached to a bracket assembly 80 by means of a clip 81 as shown in Figures 1 and 3.

An elongate helical spring member 82 has one end thereof within the spring seat 54 and the other end thereof attached to the slide arm member 68. The helical spring 82 may be either a compression spring or a tension spring but is shown herein as a compression spring. The spring 82 acts as a force against movement of the lever 26 by the thermal responsive actuator 30.

It is readily understood that the force in the direction of valve closing applied to the lever 26 by means of the spring 82 is dependent upon the angle of the spring 82 with respect to the lever 26. Thus, when the spring 82 is positioned as shown in Figure 3, the minimum amount of force is applied to the lever 26 against movement of the lever 26 by the thermal responsive actuator 30. Furthermore, when the spring member 82 is moved to the position shown in Figure 4, the force applied to the lever 26 by the spring 82 is substantially the maximum. It is to be noted that for any given position of the lever 26, the spring 82 is maintained at substantially constant length during pivotal movement as the spring is compressed between the spring seat 54 and the slide arm 68.

If it is desired to directly change the compression or tension of a pivotal spring, as one end of the spring is moved along a cam member, the cam member may be of a shape other than arcuate or may have a radius of curvature greater or less than the distance from the cam to the spring seat. As shown in Figure 7, a cam member 90 has a curvature which is not an arc of a circle having a center adjacent a lever 91. A spring member 92, disposed between the cam 90 and the lever 91, has the upper end thereof movable along the cam member 90. The spring 92 thus increases in length along the central portion of the cam 90 during pivotal movement of the spring 92. Thus, a different value of force is applied, as well as a different angle of force, to the lever 91 as the spring member 92 is pivotally moved about the lever 91. The lever 91 is similar to the lever 26 shown in Figures 1, 2, 3, 4 and 5.

Figure 8 shows a cam member 94 which has a different curvature from the curvature of cam 90 shown in Figure 7. A spring member member 96 has one end thereof pivotally attached to a lever 97 and the other end thereof slidably engaging the cam member 94. Thus, for any given position of the lever 97, the spring 96 decreases in length when the spring is pivotally moved along the central portion of the arcuate cam 94.

Thus, it is to be understood that by means of any suitable cam member the compression or tension of a spring may be changed as desired during pivotal movement of a spring member so that desired changes in value and angle of the resilient force are obtained.

In Figures 10, 11, and 12, a lever member 100, similar to the lever member 26, shown in Figures 1, 2, 3, 4 and 5, is resiliently urged by means of a spring member 102. The spring member 102 is resiliently disposed between a spring seat 104, which is pivotally attached to the lever 100, and an inverted U-shaped cap member 106. The U-shaped cap member 106 is provided with legs 108 which extend downwardly adjacent the lever 100. The lower ends of the legs 108 of the cap member 106 are provided with lateral flange members 110 which are engaged by pivot fingers 112, which are carried by support members 113. Each of the flange members 110 is engaged by a plurality of pivot fingers 112. Each pivot finger 112 is paired with another pivot finger 112 which engages the flange member 110 at the opposite side of the lever 100. The cap member 106 with the legs 108 may be pivotally moved about any pair of pivot members 112.

As shown in Figure 12, the pivotal axis of the U-shaped cap member 106 with respect to the pivotal axis of the spring 102 changes during pivotal movement about either of the pairs of pivot fingers 112. Thus, the tension or compression of a spring member, such as the spring member 102, changes during pivotal movement of the spring member 102. Also, the angle of the spring member 102, with respect to the lever 100, changes during pivotal movement of the spring member 102.

Figure 9 shows the use of a thermal responsive actuator 120 which is a different type of thermal responsive actuator from the actuator 30 shown in Figures 1, 2, 3, and 4. The actuator 120 is only responsive to fluid temperature and is not responsive to external fluid pressures to which the thermal responsive actuator 120 is subjected. The thermal responsive actuator 120 is provided with an actuator pin 122 which is attached to a lever member 124. Within the actuator 120 is a body of expansible-contractible material 125 which applies force to the pin 122. A spring member 126 is pivotally movable about the lever 124 for changing the forces applied to the lever 124, as discussed above with respect to spring members 82, 96, and 102.

Thus, it is understood that a valve mechanism of this invention may be provided with resilient members which change in both angle and magnitude during pivotal movement thereof, or the resilient member of this invention may substantially change only in the angle of the force applied during pivotal movement of the resilient member with respect to the valve lever.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. In an automatic temperature control assembly, a pivotal lever, thermal responsive actuator means operably attached to the lever for pivotal movement thereof, a stationary cam member disposed in spaced relation from the lever, the cam member having an elongate continuous cam surface provided with an arcuate portion, the cam member having a channel therein extending along the length thereof, an elongate flexible arm slidably movable in the direction of its length in the channel, operator means attached to the flexible arm for movement thereof, a coil spring member, the coil spring member having one end thereof pivotally engaging the lever, the other end of the spring member being attached to the flexible arm, the spring member urging movement of the lever with respect to the cam member, the arcuate portion of the cam surface having parts thereof at various distances from the point of pivotal engagement of said one end of the spring member to the lever so that the end of the spring member which is attached to the flexible arm defines an arc as said end of the spring member moves along the arcuate portion of the cam member, movement of the flexible arm thus causing pivotal movement of the spring member so that the angle of the spring member changes with respect to the lever, the spring member also varying in length as the said other end of the spring member is moved along the arcuate portion of the cam surface by the flexible arm.

2. A valve assembly of the type provided with support structure, a lever pivotally attached to the support structure, a valve member attached to the lever, a thermal responsive actuator attached to the lever for pivotal movement thereof, the combination comprising a fixed stationary cam member carried by the support structure in spaced relation from the lever and having an elongate continuous portion, a portion of the cam member having an arcuate surface, an elongate compression spring disposed between the cam member and the lever, the spring urging the lever in a direction from the cam member, the cam member having a channel therein, an elongate flexible arm slidably movable in the direction of its length within the channel, operator means attached to the arm for movement thereof, the compression spring having one end thereof pivotally engaging the lever, the other end of the compression spring being attached to the flexible arm, movement of the flexible arm thus causing pivotal movement of the spring, the arcuate surface having continuous coplanar portions at various distances from the point of pivotal engagement of the spring with the lever so that the spring varies in extended length from the lever as well as changing in angle with respect to the lever as the said other end of the spring is moved along the arcuate surface by the arm.

References Cited in the file of this patent

UNITED STATES PATENTS

| | | |
|---|---|---|
| 200,749 | Nichols | Feb. 26, 1878 |
| 578,297 | Sharpneck | Mar. 2, 1897 |
| 945,151 | Blauvelt | Jan. 4, 1910 |
| 1,430,467 | Peck | Sept. 26, 1922 |
| 1,695,241 | Eggleston | Dec. 11, 1928 |
| 2,178,122 | Ostler | Oct. 31, 1939 |
| 2,358,739 | Schoeninger | Sept. 19, 1944 |

FOREIGN PATENTS

| | | |
|---|---|---|
| 682,923 | Great Britain | Nov. 19, 1952 |